US012077415B2

(12) United States Patent
Geisshüsler et al.

(10) Patent No.: US 12,077,415 B2
(45) Date of Patent: Sep. 3, 2024

(54) APPARATUS FOR GUIDING AND BRAKING A TRAVELLING BODY OF AN ELEVATOR SYSTEM, WHICH BODY IS TO BE MOVED ALONG A GUIDE TRACK

(71) Applicant: Inventio AG, Hergiswil (CH)

(72) Inventors: Michael Geisshüsler, Sursee (CH); Faruk Osmanbasic, Sins (CH); Adrian Steiner, Inwil (CH); Julian Stähli, Meggen (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 84 days.

(21) Appl. No.: 17/756,483

(22) PCT Filed: Dec. 2, 2020

(86) PCT No.: PCT/EP2020/084231

§ 371 (c)(1),
(2) Date: May 26, 2022

(87) PCT Pub. No.: WO2021/110726

PCT Pub. Date: Jun. 10, 2021

(65) Prior Publication Data

US 2023/0049908 A1 Feb. 16, 2023

(30) Foreign Application Priority Data

Dec. 2, 2019 (EP) .................................... 19212903

(51) Int. Cl.
*B66B 5/18* (2006.01)
*B66B 7/04* (2006.01)

(52) U.S. Cl.
CPC . *B66B 5/18* (2013.01); *B66B 7/04* (2013.01)

(58) Field of Classification Search
CPC .... B66B 7/02; B66B 5/18; B66B 5/16; B66B 5/22; B66B 7/04
See application file for complete search history.

(56) References Cited

U.S. PATENT DOCUMENTS 1,581,459 A * 4/1926 Lindquist .................. B66B 5/22 187/373
5,096,020 A * 3/1992 Korhonen ................. B66B 5/22 188/43

(Continued)

FOREIGN PATENT DOCUMENTS

CN 103010900 A 4/2013
CN 103648953 A 3/2014

(Continued)

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

An apparatus for guiding and braking an elevator system traveling body movable along a guide track includes a holder fastened to the body, a guide device and a braking device. The holder transmits guiding forces between the guide device, guided on at least one track surface in the longitudinal direction, and the body. The guide device is held on and is elastically movable relative to the holder transverse to the longitudinal direction by at least a predetermined tolerance distance. The braking device includes a carrier and a braking element movable between a deactivated configuration, in which a braking surface of the braking element is laterally spaced apart from the guide track, and an activated configuration, in which the braking surface abuts the guide track, in a reversible manner by an activation distance transverse to the guide track. The carrier of the braking device is rigidly coupled to the guide device.

15 Claims, 3 Drawing Sheets

(56) References Cited

U.S. PATENT DOCUMENTS

| | | | | | |
|---|---|---|---|---|---|
| 5,159,995 | A * | 11/1992 | Sissala | B66B 5/22 | 187/376 |
| 6,131,704 | A * | 10/2000 | Viita-Aho | B66B 5/18 | 188/173 |
| 8,186,483 | B2 * | 5/2012 | Sirigu | B66B 5/22 | 187/373 |
| 8,312,972 | B2 * | 11/2012 | Gremaud | B66B 5/22 | 187/371 |
| 10,562,739 | B2 * | 2/2020 | Hu | B66B 5/22 | |
| 2008/0296097 | A1 * | 12/2008 | Syrman | B66B 5/18 | 187/373 |
| 2017/0066627 | A1 | 3/2017 | Hu et al. | | |
| 2018/0162694 | A1 * | 6/2018 | Hu | B66B 5/22 | |
| 2018/0194595 | A1 * | 7/2018 | Li | B66B 7/042 | |

FOREIGN PATENT DOCUMENTS

| | | | | |
|---|---|---|---|---|
| CN | 104936882 | A | 9/2015 | |
| EP | 1400476 | A1 | 3/2004 | |
| EP | 1783086 | B1 * | 3/2014 | B66B 5/18 |
| EP | 3141511 | A1 | 3/2017 | |
| JP | H07206310 | A | 8/1995 | |
| JP | H11199159 | A | 7/1999 | |
| KR | 200278377 | Y1 | 6/2002 | |
| WO | 2004033353 | A1 | 4/2004 | |
| WO | WO-2005068337 | A1 * | 7/2005 | B66B 5/18 |
| WO | 2015071188 | A1 | 5/2015 | |

* cited by examiner

APPARATUS FOR GUIDING AND BRAKING A TRAVELLING BODY OF AN ELEVATOR SYSTEM, WHICH BODY IS TO BE MOVED ALONG A GUIDE TRACK

FIELD

The present invention relates to an elevator system. In particular, the invention relates to an apparatus by means of which a traveling body to be moved on a guide track can be guided and braked in an elevator system.

BACKGROUND

An elevator system usually comprises a plurality of traveling bodies which are guided by at least one guide track in order to prevent them from lateral, i.e. substantially horizontal, movements. The traveling bodies are usually an elevator car and often at least one counterweight. In an elevator system, a traveling body is generally moved vertically between different levels. For this purpose, a plurality of guide devices, for example in the form of guide shoes, are usually provided on the traveling body, which devices can move along the vertically extending guide track and be supported thereon in the lateral direction.

In order to be able to brake vertical movements of the traveling body, the elevator system generally also has a braking device. Such a braking device can be configured as a so-called safety brake in order to be able to stop the vertical movement of the traveling body as reliably, quickly and efficiently as possible in emergency situations such as free fall. In this case, the braking device can have a braking element which is pressed against the guide track when the braking device is activated and can thus exert a desired braking force on the traveling body coupled to the braking device due to the friction generated thereby.

In elevator systems, guide tracks are usually not oriented perfectly in parallel with a desired travel path of a traveling body, for example due to manufacturing and/or installation tolerances. In other words, at least locally limited portions of a guide track cannot be linear and perfectly vertical but are instead curved and/or oriented at an angle. In practice, in particular in the case of very tall elevator systems, lateral deviations in the position of a guide track from a desired position of up to several millimeters can occur. In this case, the deviations can vary along a longitudinal extension of the guide track. A further complication is that, in particular in the case of elevators in very tall buildings, relatively high speeds are typically required when moving the traveling body, so that lateral deviations of the guide track from the desired position thereof can lead to a rapid, abrupt lateral displacement of the traveling body.

In order to be able to maintain a high level of travel comfort for passengers in the elevator system, the guide devices on elevator cars of elevator systems are usually designed to be elastically mounted. In other words, the guide devices can yield to the deviations of the guide track from the desired position to a certain extent, at least within a predetermined tolerance range, without exerting strong and/or in particular abrupt forces on the elevator car in the lateral direction.

The design of the braking device of an elevator system must also take into account the possible lateral deviations of the guide track from the desired position thereof. For this purpose, the braking device is conventionally designed such that the braking element thereof is laterally remote from the desired position of the guide track by a sufficiently dimensioned activation distance, as long as the braking device is not activated. In this case, the activation distance is selected such that the braking element does not come into contact with the guide track, even in the case of maximum expected lateral deviations of the guide track from the desired position, as long as the braking device has not been activated.

However, the relatively large activation distance to be selected in conventional braking devices means that when the braking device is to be activated, the braking element must first be moved over the entire activation distance until the surface thereof comes into contact with the guide track and a braking effect can be generated. For this purpose, an actuator which moves the braking element must be suitably designed in order to be able to overcome such a large activation distance. A certain amount of time is also required to move the braking element over a large activation distance, which can have a negative effect on the reaction time of the braking device and ultimately on the braking distance.

WO 2004/033353 A1 describes an apparatus for combining an elevator guide and a safety braking system. A housing assembly for a safety actuation apparatus is described in EP 3 141 511 A1. A safety gear for elevators is described in EP 1 400 476 A1.

SUMMARY

Among other things, there may be a need for an apparatus, by means of which a traveling body, in particular an elevator car, can be comfortably moved along a guide track in a guided manner and by means of which the movement of the traveling body can be braked efficiently, quickly and reliably. Furthermore, there may be a need for an elevator system having such an apparatus.

Such a need can be met by the subject matter of any of the advantageous embodiments that are defined in the following description.

According to a first aspect of the invention, an apparatus is proposed for guiding and braking a traveling body to be moved along a guide track, which apparatus comprises a holder, a guide device and a braking device. The holder can be fastened to the traveling body. Guiding forces can be transmitted between the guide device, which can be guided on the guide track, and the traveling body. The guide device is configured to move along at least one surface of the guide track in the longitudinal direction of the guide track. The guide device is held and mounted on the holder such that the guide device is elastically movable relative to the holder in a direction transverse to the longitudinal direction of the guide track by at least a predetermined tolerance distance, and thus transmits the guiding forces to the holder. The braking device comprises a carrier and a braking element and is configured to move the braking element between a deactivated configuration, in which a braking surface of the braking element can be laterally spaced apart from the guide track, and an activated configuration, in which the braking surface of the braking element can be applied to the guide track, in a reversible manner by an activation distance in a direction transverse to the guide track. The carrier of the braking device is rigidly coupled to the guide device, such that the carrier of the braking device follows lateral movements of the guide device relative to the holder.

According to a second aspect of the invention, an elevator system is proposed which comprises a traveling body, a guide track and an apparatus according to an embodiment of the first aspect of the invention, the holder of the apparatus being fastened to the traveling body and the guide device of the apparatus being arranged to be movable along the guide track in a guided manner.

Possible features and advantages of embodiments of the invention can be considered, inter alia and without limiting the invention, to be based upon the concepts and findings described below.

As already indicated at the outset, embodiments of the apparatus proposed herein are to make it possible to comfortably guide the traveling body of an elevator system along one or more guide tracks during movements in the vertical direction and to be able tolerate lateral deviations in the local position of the guide track from a desired position such that as little lateral movements as possible, in particular as far as possible no abrupt lateral movements, are caused on the traveling body. For this purpose, a tolerance distance within which the guide device can follow deviations of the guide track from the desired position is to be relatively large. Overall, abrupt movements of the traveling body are to be prevented and thus a high level of travel comfort for passengers is to be provided. The proposed apparatus is also intended to make it possible to brake the traveling body efficiently, quickly and reliably.

Within the scope of the description of the proposed apparatus, a traveling body can be understood to mean both an elevator car and a counterweight. A high level of travel comfort is particularly advantageous for elevator cars. Efficient, fast and reliable braking is advantageous for both elevator cars and counterweights.

In the case of conventional elevator systems, the two objectives mentioned are contradictory to a certain extent. In order to achieve a high level of travel comfort, the tolerance distance with which the guide device can follow the guide track at local lateral deviations should be as large as possible. In conventional elevator systems, the braking devices are usually configured and arranged such that their activation distance, by which their braking elements have to be laterally moved in order to generate a braking effect by abutting the guide track, is greater than the tolerance distance of the guide device. However, the greater this activation distance, the more difficult it is to move the braking elements quickly and efficiently over this activation distance in order to be able to brake the traveling body.

In embodiments of the apparatus proposed herein, the dilemma of previous elevator systems, that the activation distance of the braking device generally had to be greater than the tolerance distance of the guide device, can be overcome.

In particular, in embodiments of the proposed apparatus, the activation distance can be smaller, for example by more than 10%, preferably more than 50%, or even more than 80%, than the tolerance distance. For example, the tolerance distance of the guide device can be preferably greater than 3 mm, more preferably greater than 4 mm, or even greater than 5 mm or greater than 10 mm, whereas the activation distance of the braking device can be preferably less than 3 mm, more preferably less than 2 mm. The guide device can thus follow lateral deviations of the guide track along which the device is to run with a large tolerance, but the braking device only needs to move the braking element thereof over a short activation distance in order to be able to quickly and efficiently brake the traveling body.

In order to achieve this, the holder, the guide device and the braking device of the proposed apparatus are to be configured and arranged in a predetermined manner and are to interact with one another.

The holder is primarily to be configured to be fastened to the traveling body and thus fix the other components of the apparatus to the traveling body. For this purpose, the holder is to be sufficiently mechanically stable to be able to absorb guiding forces and transmit them to the traveling body. Guiding forces can occur, for example, in a range from a few newtons to a few kilonewtons for a short time. Such guiding forces can be exerted on the holder by the guide device, for example, if the guide device is abruptly moved laterally, for example, in order to follow local position deviations of the guide track.

For example, the holder can be designed as a structure which is largely rigid per se, and as a structure to be rigidly fastened to the traveling body. Specifically, the holder can be designed, for example, as a frame, housing or the like. The holder can be made of a mechanically loadable material, in particular a metal such as steel. In this case, the holder can be fastened to the traveling body in a substantially stationary manner, for example by being fixed to the traveling body by means of fastening means such as screws, bolts or the like.

The guide device is configured to be moved along at least one surface of the guide track, following the longitudinal direction of the guide track. For this purpose, the guide device can have guide means, as explained in more detail below, which can roll, slide or move in some other way along the surface of the guide track.

The guide device and the holder in this case cooperate such that the guide device can be moved in the lateral direction relative to the holder. In other words, the guide device is held and mounted on the holder such that it can be moved transversely to the longitudinal direction of the guide track, relative to the holder, at least over the predetermined tolerance distance.

In this case, a mechanical coupling between the guide device and the holder is to be configured such that the relative movement between the two components can take place elastically, i.e. without plastic and thus irreversible deformations of components used for such a coupling. Furthermore, the mechanical coupling between the guide device and the holder is to be configured such that the guiding forces can be transmitted from the guide device to the holder.

Overall, the guide device can thus be moved along the guide track and elastically follow any lateral deviations at least up to the specified tolerance distance. Forces exerted in the lateral direction can be elastically transmitted to the holder and thus to the traveling body in order to guide the traveling body during the vertical movement thereof, but also to prevent abrupt lateral movements.

As long as it is not activated, the braking device is configured to have as little significant influence as possible on the movement of the traveling body, but to cause braking, in particular possibly emergency braking, of the traveling body when the braking device is activated.

For this purpose, the braking device has at least one carrier and one braking element. The braking element in this case can be moved relative to the carrier. In particular, the braking element can be moved between a deactivated configuration and an activated configuration in a direction transverse to the guide track. In the deactivated configuration, the braking surface of the braking element is laterally spaced apart from the guide track. In other words, there can be a gap between the braking surface of the braking element and an opposing surface of the guide track. The lateral distance or the width of the gap substantially corresponds to the activation distance of the braking device. In the activated configuration, i.e. when the braking device is to carry out a braking operation, the braking surface of the braking element abuts the guide track. The braking element can be reversibly moved between the deactivated and the activated configuration by moving the element in the direction transverse to the guide track by the activation distance. Depending on the design of the braking device, the braking surface of the braking element can be moved in a purely linear manner, for example by the entire braking element being moved laterally. Alternatively or additionally, the braking surface of the braking element can be moved in a curved movement, for example a pivoting movement or a rotary movement, for example by eccentrically moving the entire braking element about a pivot axis or axis of rotation.

In the apparatus proposed here, the carrier of the braking device and the guide device are rigidly coupled to one another. In other words, the braking device is mechanically connected to the guide device such that movements of the guide device are transmitted to the carrier of the braking device to substantially the same extent. In other words, the braking device is mounted in a floating manner and the carrier thereof follows lateral movements of the guide device.

Since the guide device is supported on the guide track and can move elastically relative to the holder and thus relative to the traveling body, the braking device and in particular the carrier thereof is also held and guided such that it is always held at a constant lateral distance from the guide track and can follow deviations of the guide track from the desired position thereof, and such that it can also be moved laterally relative to the holder and thus the traveling body.

The lateral distance between the braking surface of the braking element of the braking device and the opposing surface of the guide track, i.e. the activation distance of the braking device, in this case can be significantly less than the tolerance distance by which the braking device can be elastically moved laterally relative to the holder together with the guide device.

According to one embodiment, the guide device comprises at least one roller which is rotatable about an axle and which is configured and arranged such that the roller can be moved along the surface of the guide track in a rolling manner with a lateral surface. In this case, the carrier of the braking device is rigidly connected to the axle of the roller.

In other words, the guide device can be designed as a type of guide shoe, in which a roller which is rotatable about an axle is used to roll along a surface of the guide track that is used as a guide. The roller in this case follows the local position of the guide track, even if it deviates from a desired position. The axle of the roller moves in parallel with the surface of the guide track at a constant distance that substantially corresponds to the diameter of the roller.

In this case, the carrier of the braking device is to be rigidly connected to the axle of the roller of the guide device. For example, the carrier can be coupled directly or indirectly via intermediate rigid components, such as a housing or frame on which the axle of the roller is mounted, to the axle of the roller such that the axle can rotate but substantially cannot move relative to the carrier of the braking device. Accordingly, the carrier of the braking device is held by the roller in a floating manner at a constant distance from the surface of the guide track.

According to one embodiment, the guide device comprises at least two rollers which are each rotatable about an axle and which are configured and arranged such that each of the rollers can be moved along the surface of the guide track in a rolling manner with a lateral surface, and the rollers can be moved along opposite surfaces of the guide track in a rolling manner, the carrier of the braking device being rigidly coupled to the axle of at least one of the rollers.

The two rollers of the guide device can thus be configured and arranged such that the lateral surfaces thereof face one another at a distance, such that the guide track can extend in a gap between the two lateral surfaces and the two rollers can be supported on the opposite surfaces of the guide track. In other words, the two rollers can accommodate the guide track therebetween. A width of the gap between the lateral surfaces of the rollers can substantially correspond to the thickness of the guide track or at most be slightly larger than the thickness. Accordingly, the guide device is held on the guide track via the two rollers in two mutually opposite directions and is guided by the guide track. Together with the rollers, the carrier of the braking device is then also held at a constant distance from the guide track in the two opposite directions.

Additionally or alternatively, according to one embodiment, the guide device can comprise at least two rollers which are each rotatable about an axle and which are configured and arranged such that each of the rollers can be moved along the surface of the guide track in a rolling manner with a lateral surface, and the rollers can be moved along surfaces of the guide track that are oriented transversely to one another in a rolling manner, the carrier of the braking device being rigidly coupled to the axle of at least one of the rollers.

In this case, the rollers are thus arranged such that they cannot roll on opposite surfaces of the guide track, but rather on surfaces of the guide track which extend transversely to one another. For example, one roller can roll along a lateral surface of the guide track and the other roller can roll along an end face of the guide track. While in the embodiment described above the axles of the two rollers are generally oriented in parallel with one another, in this embodiment the axles of the two rollers are oriented transversely, in particular perpendicularly, to one another. By means of the two axles configured and arranged in this way, the guide device can thus be supported on the guide track in two directions extending transversely to one another.

It can be particularly preferable to equip the guide device with at least three rollers. In this case, two rollers having mutually parallel axles and lateral surfaces facing one another can be provided, which can be supported on opposite surfaces of the guide track. A third roller can be arranged with its axle transverse to the other two axles and can be mounted in a position such that its lateral surface can roll along the end face of the guide track that connects the opposite surfaces of the guide track. In this way, the guide device is guided with the rollers thereof in at least the two opposite directions and the direction extending transversely thereto.

According to a specific embodiment of the two aforementioned embodiments, the axles of the rollers can be rigidly coupled to one another.

In other words, the axles on the guide device can be arranged in fixed positions relative to one another. For example, the axles of the various rollers can each be mounted on a component which rigidly connects the rollers, such as a common housing or a common frame. The carrier of the braking device can then also be rigidly coupled to this connecting component, such that the braking device is indirectly guided in a floating manner by the rollers of the guide device at a fixed distance in parallel with the guide track.

According to one embodiment, the guide device can be held and mounted on the holder such that the guide device is elastically movable relative to the holder in two directions which extend transversely to one another and in each case transversely to the longitudinal direction of the guide track by at least a predetermined tolerance distance in each case, and the guide device thus transmits the guiding forces in the two directions to the holder.

In other words, the guide device can interact with the holder such that the two components can be moved in different directions relative to one another within a plane extending transversely to the longitudinal direction of the guide track. That is to say, the guide device can be moved relative to the holder in a direction which extends orthogonally to the surfaces of the guide track that also function as braking surfaces, and the guide device can also be moved relative to the holder in a direction which extends orthogonally to the end face of the guide track that connects these surfaces.

Since, as stated above, the guide device preferably has at least three rollers, for example, in order to be guided along the guide track in the three directions mentioned, guiding forces can thus be transmitted between the guide device and the holder in all guided directions and the guide device can still be elastically moved relative to the holder within the specified tolerance distance in all three directions.

According to one embodiment, the guide device is held and mounted on the holder via elastic elements.

In other words, there can be elastic elements between the guide device and the holder, which transmit the guiding forces between the two components and which are sufficiently elastically deformable to allow the guide device to be able to move within the tolerance distance relative to the holder.

The elastic elements can, for example, be springs, for example spiral or helical springs, one end of which interacts with the guide device and the opposite end of which interacts with the holder. Alternatively, the elastic elements can be formed with a sufficiently elastic material such as an elastomer and can be provided as a layer or sheet between the guide device and the holder. The elastic elements can be elastically deflectable at least over the tolerance distance.

According to a specific embodiment, the braking element can be wedge-shaped and the braking element comprises a sliding surface which can be arranged so as to extend obliquely to the surface of the guide track. The carrier can then comprise a counter-sliding surface which can be arranged so as to extend obliquely to the surface of the guide track in the opposite direction, such that the braking element can be reconfigured during a movement relative to the carrier by sliding the sliding surface along the counter-sliding surface between the deactivated configuration and the activated configuration.

In other words, the braking device can be designed with one or more wedge-shaped braking elements, similar to conventional safety brakes on traveling bodies. A braking element in this case comprises the braking surface on a side which faces the guide track and has the sliding surface which extends obliquely thereto on the opposite side. A counter-sliding surface which is correspondingly obliquely inclined in a complementary manner is provided on the holder. In order to be activated, the wedge-shaped braking element can be moved relative to the holder in a direction parallel to the longitudinal direction of the guide track. The wedge-shaped braking element in this case slides along the counter-sliding surface and is thereby simultaneously moved in an orthogonal direction toward the guide track until the braking surface of the braking element abuts the opposing surface of the guide track. A contact pressure between the braking element and the guide track is also further increased in that the braking element is entrained by the guide track due to the friction acting between the two components and is pulled further along the counter-sliding surface and thus pressed even more strongly against the guide track.

Before the braking device is activated, the braking surface of the wedge-shaped braking element can always be moved in parallel with the surface of the guide track, for example only a few millimeters away from the surface of the guide track, since the braking element is always held at the desired distance from the surface of the guide track together with the carrier of the braking device due to the rigid coupling thereof to the guide device. This activation distance can be relatively small, for example less than 3 mm. In order to activate the braking device, this activation distance can then be covered quickly and without a large movement path of the braking element of the braking device.

According to one embodiment, in the apparatus proposed here, the braking device can also comprise an electric actuator which is configured to move the braking element between the deactivated configuration and the activated configuration.

In this case, the electric actuator can comprise an electric motor, for example, which, in the case of a suitable energy supply, can move the braking element from the deactivated configuration into the activated configuration and optionally also back again. By means of such an electrical actuator, the braking device can be activated and/or returned to the deactivated configuration thereof after activation using an electrical signal which is simple to transmit.

However, the movement of the braking element can often only be carried out relatively slowly by means of an electric actuator, since sufficiently large actuating forces should also be produced at the same time. It is therefore advantageous for the apparatus described herein that the braking element can always be positioned very close to the surface of the guide track, even in the deactivated configuration, and thus only needs to be moved over a short activation distance.

An alternative embodiment of the electric actuator can contain a spring and a trigger, the trigger comprising, for example, an electromagnet which holds the spring in a tensioned position via a holding plate held by means of magnetic forces. By interrupting the current flow, the holding plate, and thus the spring, is released and the spring moves the braking element into the activated configuration.

It should be noted that some of the possible features and advantages of the invention are described herein with reference to different embodiments of the apparatus for guiding and braking a traveling body and an elevator system equipped therewith. A person skilled in the art will recognize that the features can be suitably combined, adapted or replaced in order to arrive at further embodiments of the invention.

Embodiments of the invention will be described below with reference to the accompanying drawings; neither the drawings nor the description are intended to be interpreted as limiting the invention.

The drawings are merely schematic and not true to scale. Like reference signs denote like or equivalent features in the various drawings.

DETAILED DESCRIPTION

Figure 1:
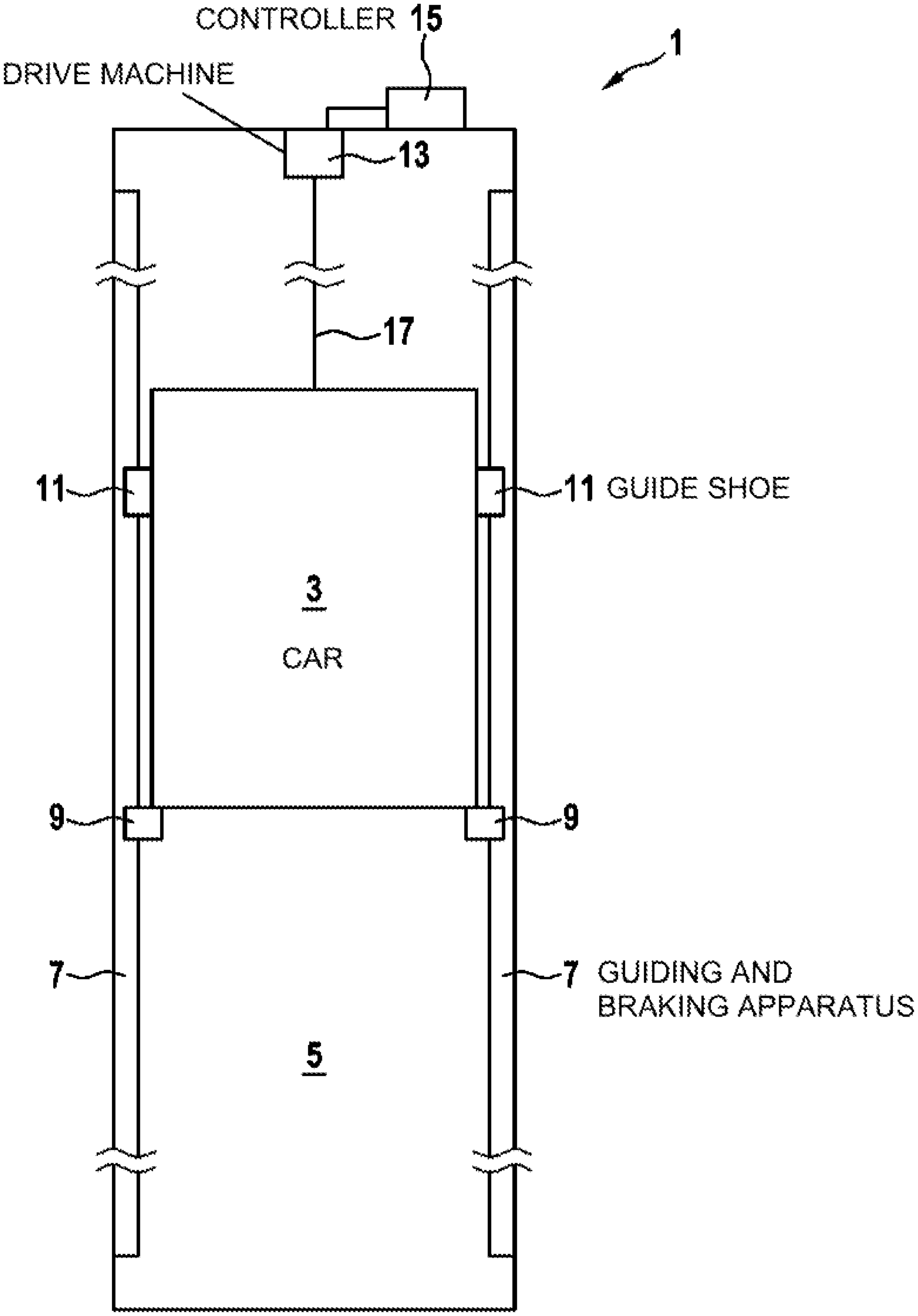
FIG. 1 shows an elevator system according to an embodiment of the present invention.

FIG. 1 shows an elevator system 1 according to an embodiment of the present invention. The elevator system 1 comprises a traveling body in the form of an elevator car 3 which can be moved vertically within an elevator shaft 5. For this purpose, the elevator car 3 is held by suspension means 17 which can be moved under the control of a controller 15 by a drive machine 13. In this case, the elevator car 3 can move along guide tracks 7 which extend vertically along walls of the elevator shaft 5.

The drive machine 13 can be configured as a winch. Alternatively, the drive machine 13 can be configured as a traction sheave drive having a drive roller. In this case, the elevator system 1 also comprises a counterweight and possibly a deflection roller in addition to the traction sheave drive. The suspension means is extended in order to also hold the counterweight. The suspension means is guided from the counterweight, via the drive roller and possibly via one or more deflection rollers to the elevator car 3. The drive roller, the counterweight, the deflection roller and the extension of the suspension means are not shown in FIG. 1. The counterweight can also have a guide shoe 11 and an apparatus 9 as described below.

For this purpose, apparatuses 9 for guiding and braking the elevator car 3 are attached to a floor of the elevator car 3 in the example shown. Alternatively, such apparatuses 9 can also be attached to the elevator car 3 at another location. The apparatuses 9 are designed, similar to guide shoes, to prevent the elevator car 3 from moving laterally, i.e. horizontally, during the vertical travel thereof through the elevator shaft 5. The apparatuses 9 can optionally be supported in this task by additionally provided guide shoes 11. The apparatuses 9 are also intended to be able to brake the elevator car 3 in the vertical movement thereof. In particular, it is to be possible to carry out quick and effective emergency braking of the elevator car 3 by means of the apparatuses 9.

Figure 2:
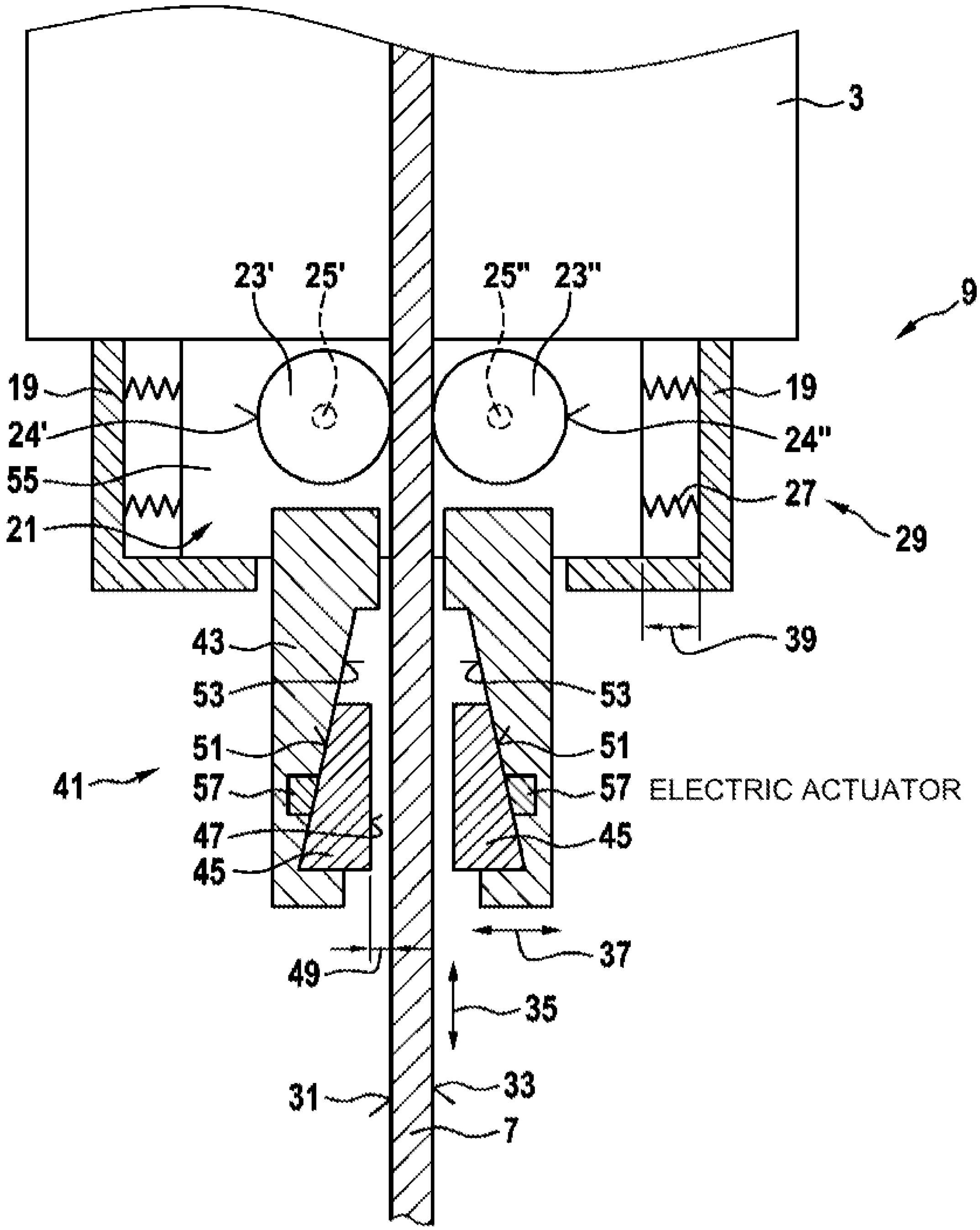
FIG. 2 is a vertical sectional view through an apparatus according to an embodiment of the present invention.
Figure 3:
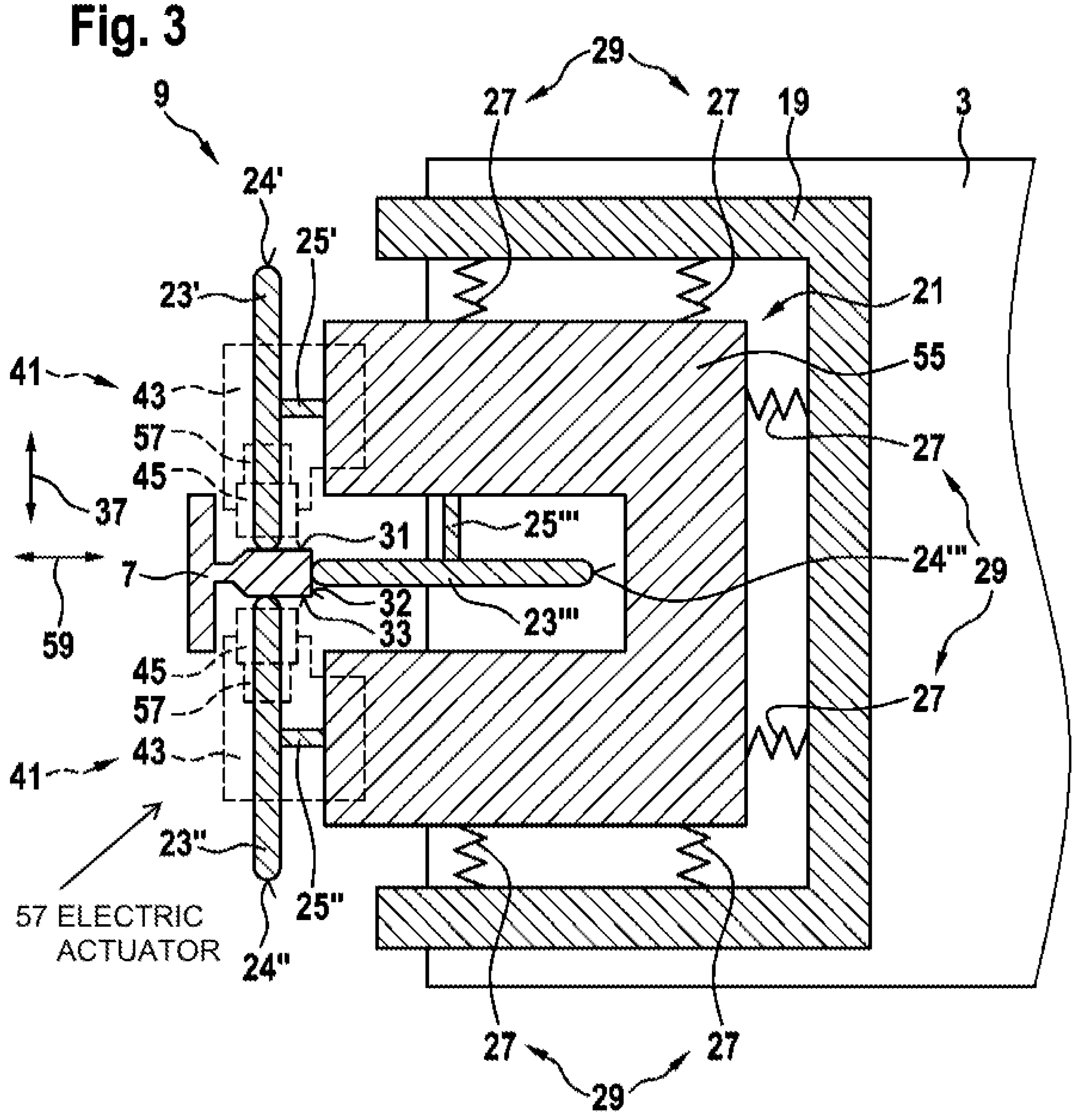
FIG. 3 is a horizontal sectional view through an apparatus according to an embodiment of the present invention.

Details of an embodiment according to the invention of such an apparatus 9 for guiding and braking the elevator car 3 are shown in FIGS. 2 and 3 in a vertical and a horizontal sectional view. For reasons of clarity, some components, in particular components of a braking device 41, are only shown in dashed lines in FIG. 3.

The apparatus 9 has a holder 19 by means of which the entire apparatus 9 can be fastened to the elevator car 3. The holder 19 is in this case structurally designed such that it can transmit guiding forces, such as typically occur when the elevator car 3 is guided along the guide tracks 7.

The apparatus 9 also has a guide device 21. The guide device 21 can move along at least one of two opposite surfaces 31, 33 of the guide track 7 in the longitudinal direction 35 of the guide track 7.

The guide device 21 is held on the holder 19 in an elastically movable manner, such that the guide device 21 elastically movable relative to the holder 19 in a direction 37 transverse to the longitudinal direction 35 of the guide track 7 by at least a tolerance distance 39 of, for example, a plurality of millimeters, and thus transmits the guiding forces to the holder 19.

The apparatus 9 also has a braking device 41. The braking device 41 comprises a carrier 43 and a braking element 45.

In a deactivated configuration, the braking element 45 is in this case arranged such that a braking surface 47 of the braking element 45 is laterally spaced apart from the guide track 7. A distance between the braking surface 47 and the opposing surface 31, 33 of the guide track 7 is referred to here as the activation distance 49. In an activated configuration, however, the braking element 45 is arranged such that the braking surface 47 abuts the guide track 7.

As long as the elevator car 3 is to be moved without braking, the braking device 41 remains in the deactivated configuration thereof. If the elevator car 3 is to be braked, an electric actuator 57 can move the braking element 45 along the counter-sliding surface 53 over the activation distance 49 toward the guide track 7, such that the braking surface 47 of the element rests against the opposing surface 31, 33 of the guide track 7 and a braking force can thus be generated by friction. The distance traveled by the brake pad 45 along the counter-sliding surface 53 is greater than the activation distance 49.

The carrier 43 of the braking device 41 is rigidly coupled to the guide device 21. Accordingly, the carrier 43 follows the lateral movements of the guide device 21 relative to the holder 19 when the guide device 21 moves along the guide track 7 in a guided manner.

Possible details of how the individual components of the apparatus 9 described herein can be configured are described below by way of example.

As can be seen in FIG. 3, the holder 19 is designed as a frame which is U-shaped in the horizontal section in the example shown. The holder 19 in this case surrounds the guide device 21 from three sides, i.e. on opposing sides along the horizontal direction 37, transversely to the longitudinal direction 35 of the guide track 7, and on a side of the guide device 21 that faces away from the guide track 7 in a further horizontal direction 59. The frame of the holder 19 is in this case designed to be mechanically stable, for example with a thick metal sheet. In addition, the holder 19 is fastened to the traveling body 3 so as to be able to withstand mechanical loads, for example by means of screw connections.

In the example shown, the guide device 21 has a carrier frame 55 on which a plurality of rollers 23', 23" are each rotatably fixed about axles 25', 25". The carrier frame 55 is in turn U-shaped. Axles 25', 25" are mounted in each case on end faces of two mutually parallel arms of this U-shaped carrier frame 55, such that rollers 23', 23" attached thereto are each rotatable about one of the axles 25', 25" at a distance from one another in direction 37. In this case, a gap having a predefined width results between lateral surfaces 24', 24" of these rollers 23', 23". The guide track 7 extends in this gap. The width of the gap is dimensioned such that it corresponds to the thickness of the guide track 7. Accordingly, the lateral surfaces 24', 24" of the two rollers 23', 23" can each roll along the opposite surfaces 31, 33 of the guide track 7. A third roller 23" is arranged with the axle 25'" thereof in an inner region of the U-shaped carrier frame 55. The axle 25'" of this roller 23'" extends perpendicularly to the axles 25', 25" of the other two rollers 23', 23". This third roller 23'" is oriented and positioned such that the lateral surface 24'" thereof can roll along an end face 32 of the guide track 7.

The carrier frame 55 of the guide device 21 is coupled to the holder 19 via elastic elements 29 in the form of springs 27, for example. The elastic elements 29 are arranged and oriented such that the guide device 21, with the carrier frame 55 thereof, can be elastically moved relative to the holder 19 both in the horizontal direction 37 and in the horizontal direction 59 perpendicular thereto, at least within the tolerance distance 39 in each case.

The carrier frame 55 of the guide device 21 can thus be moved within a horizontal plane in all directions by at least the tolerance distance 39, such that rollers 23', 23", 23'" attached thereto can always roll along the surfaces 31, 32, 33 of the guide tracks 7, even in the case that the guide track 7 does not always extend at the desired position thereof locally, but deviates from the position.

The carrier 43 of the braking device 41 is rigidly connected to the carrier frame 55 of the guide device 21 in the example shown. The braking element 45 of the braking device 41 is thus always carried along with the movement of the guide device 21 in a floating manner and is always located at a predetermined lateral distance from the surfaces 31, 32, 33 of the respectively associated guide track 7. This lateral distance can be equal to or less than the activation distance 49 over which the braking element 45 must be moved in order to abut an opposing surface 31, 32, 33 in the activated configuration of the braking device 41 and thereby generate a desired braking effect.

In the example shown, the braking device 41 is equipped with two wedge-shaped braking elements 45. Each wedge-shaped braking element 45 comprises, on a side opposite the braking surface 47, a sliding surface 51 which extends obliquely to the surface 31, 33 of the guide track 7 that faces the braking element. A corresponding counter-sliding surface 53 is formed on the carrier 43 of the braking device 41, which counter-sliding surface extends obliquely to the relevant surface 31, 33 of the guide track 7 in the opposite direction.

The braking element 45 can be moved from the deactivated configuration into the activated configuration by means of the electric actuator 57 (only shown schematically). In this case, the carrier 43 can have a bearing track which comprises the counter-sliding surface 53 and which can be folded away from the rest of the carrier 43, as shown in WO 2015/071188. The bearing track is hingedly mounted at one of the ends thereof on the rest of the carrier 43, such that movement in the hinge results in a movement of the bearing track in direction 37. The electric actuator 57 can move the bearing track laterally, i.e. in the direction 37 transverse to the longitudinal direction 35 of the guide track 7, toward the guide track 7. Alternatively, the actuator 57 can move the braking element toward the guide track 7 by briefly lifting the sliding surface 51 off the counter-sliding surface 53. For this purpose, the braking element 45 can have a groove which opens the braking element 45 toward the actuator 57. The actuator 57 presses against the base of the groove in the braking element 45 in the lateral direction. The groove is designed such that it provides the required space in the braking element 45 for the braking element 45 to remain movable along the longitudinal direction 35 when the electric actuator 57 at least partially protrudes into the braking element in an extended state.

Alternatively or additionally, the actuator 57 can move the braking element 45 in the longitudinal direction 35 of the guide track 7, the sliding surface 51 of the braking element sliding along the counter-sliding surface 53 of the carrier 43 and thus also being moved laterally toward the guide track 7.

As soon as the braking surface 47 of the braking element 45 rests against the guide track 7, the braking element is moved further in the longitudinal direction 35 of the guide track 7 by the friction acting between the two components. The contact pressure between the braking element 45 and the guide track 7 is further increased due to the wedge shape of the braking element 45.

Overall, the apparatus 9 described herein for guiding and braking the traveling body offers the possibility of guiding the elevator car 3 comfortably during the vertical movement thereof along the guide track 7 by means of the guide device 21 which is elastically movable over the tolerance distance. The braking device 41 of the apparatus 9, with the braking element 45 or braking elements 45 thereof in the deactivated configuration, can also be moved past the guide track 7 with very little lateral play since the braking device 41 is rigidly coupled to the guide device 21. Accordingly, the braking device 41 can be activated quickly and effectively by the braking element 45 or the braking elements 45 being brought into engagement over an activation distance 49 to the guide track 7 that is smaller than the tolerance distance 39.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An apparatus for guiding and braking a traveling body movable along a guide track, the apparatus comprising:

a holder adapted to be fastened to the traveling body;

a guide device adapted to guide the traveling body on the guide track;

a braking device adapted to brake the traveling body on the guide track;

wherein when the holder is fastened to the traveling body and the guide device is guided on the guide track, guiding forces are transmitted by the holder between the guide device and the traveling body;

wherein the guide device is movable along the guide track in a longitudinal direction of the guide track;

wherein the guide device is held and mounted on the holder such that the guide device is elastically movable relative to the holder only transverse to the longitudinal direction of the guide track by at least a predetermined tolerance distance;

wherein the braking device includes a carrier and a braking element and the braking device is adapted to move the braking element between a deactivated configuration, in which a braking surface of the braking element is laterally spaced apart from the guide track, and an activated configuration, in which the braking surface of the braking element is applied to the guide track, in a reversible manner by an activation distance transverse to the guide track; and wherein the carrier is rigidly coupled to the guide device such that the carrier follows lateral movements of the guide device relative to the holder.

2. The apparatus according to claim 1 wherein the guide device includes a roller rotatable about an axle and arranged for rolling movement along a surface of the guide track with a lateral surface of the roller, and wherein the carrier is rigidly connected to the axle of the roller.

3. The apparatus according to claim 1 wherein the guide device includes two rollers, each of the rollers being rotatable about an associated axle and being arranged for rolling movement along the guide track with lateral surfaces of the rollers, wherein the rollers are movable along opposite surfaces of the guide track, and wherein the carrier is rigidly coupled to the axle of at least one of the rollers.

4. The apparatus according to claim 3 wherein the axles of the rollers are rigidly coupled to one another by a carrier frame of the carrier.

5. The apparatus according to claim 1 wherein the guide device includes two rollers, each of the rollers being rotatable about an associated axle and being arranged for rolling movement along the guide track with lateral surfaces of the rollers, wherein the rollers are movable along surfaces of the guide track that are oriented transversely to one another, and wherein the carrier is rigidly coupled to the axle of at least one of the rollers.

6. The apparatus according to claim 5 wherein the axles of the rollers are rigidly coupled to one another by a carrier frame of the carrier.

7. The apparatus according to claim 1 wherein the guide device is elastically movable relative to the holder in two directions that extend transversely to one another and to the longitudinal direction of the guide track by at least the predetermined tolerance distance, and the guide device transmits the guiding forces in the two directions to the holder.

8. The apparatus according to claim 1 wherein the guide device is held and mounted on the holder by elastic elements.

9. The apparatus according to claim 8 wherein the elastic elements are springs.

10. The apparatus according to claim 1 wherein the braking element is wedge-shaped and has a sliding surface extending obliquely to a surface of the guide track, and wherein the carrier has a counter-sliding surface extending obliquely to the surface of the guide track in a direction opposite to the sliding surface, such that the braking element can be reconfigured during a movement relative to the carrier by sliding the sliding surface along the counter-sliding surface between the deactivated configuration and the activated configuration.

11. The apparatus according to claim 1 wherein the braking device includes an electrical actuator adapted to move the braking element between the deactivated configuration and the activated configuration.

12. The apparatus according to claim 1 wherein the activation distance is smaller than the tolerance distance.

13. The apparatus according to claim 1 wherein the tolerance distance is greater than 3 mm.

14. The apparatus according to claim 1 wherein the activation distance is less than 3 mm.

15. An elevator system comprising:

a traveling body;

a guide track along which the traveling body is movable;

the apparatus for guiding and braking according to claim 1; and wherein the holder of the apparatus is fastened to the traveling body and the guide device of the apparatus is arranged to be movable along the guide track in a guided manner.

* * * * *